United States Patent [19]

Singer et al.

[11] Patent Number: 4,620,954
[45] Date of Patent: Nov. 4, 1986

[54] HYDROGEL FROM ULTRAVIOLET-INITIATED COPOLYMERIZATION

[75] Inventors: Helmut Singer, Northboro; Ellen Bellantoni, Natick, both of Mass.; Albert R. LeBoeuf, San Diego, Calif.

[73] Assignee: CIBA Vision Care Corp., Atlanta, Ga.

[21] Appl. No.: 742,545

[22] Filed: Jun. 7, 1985

[51] Int. Cl.$^4$ ................................. C08J 3/00
[52] U.S. Cl. ................................. 264/1.4; 264/1.1; 522/13; 523/108; 526/264
[58] Field of Search ............... 523/108; 526/264; 204/159.23, 159.24; 264/1.1, 1.4

[56] References Cited

U.S. PATENT DOCUMENTS

| | | | |
|---|---|---|---|
| 3,772,235 | 11/1973 | Stamberger | 523/108 |
| 3,839,304 | 10/1974 | Hovey | 523/108 |
| 4,022,754 | 5/1977 | Howes | 526/264 |
| 4,073,577 | 2/1978 | Hofer | 204/159.23 |
| 4,433,111 | 2/1984 | Tighe | 523/108 |
| 4,492,776 | 1/1985 | Atkinson | 523/108 |

*Primary Examiner*—Paul R. Michl

[57] ABSTRACT

In the particular embodiment described in the specification, a contact lens hydrogel is prepared by copolymerizing 75 parts of N-vinyl pyrrolidone and 23 parts of phenyl ethyl methacrylate together with allyl methacrylate as a crosslinker, t-butyl peroctoate as a thermal initiator and 2,2-dimethoxy-2-phenylacetophenone or benzoin methyl ether as a photoinitiator. The mixture is maintained at a temperature of 5° C. and protected from light prior to photopolymerization which is carried out under ultraviolet radiation. The copolymer is then postcured thermally. Cloudy or hazy hydrogels are avoided by preventing prepolymerization of the mixture.

13 Claims, No Drawings

HYDROGEL FROM ULTRAVIOLET-INITIATED COPOLYMERIZATION

BACKGROUND OF THE INVENTION

This invention relates to contact lens hydrogels and, more particularly, to a new and improved hydrogel prepared by ultraviolet initiated copolymerization.

Copolymers of N-vinyl lactams such as N-vinyl pyrrolidone (NVP) and hydrophobic acrylates such as phenylethyl methacrylate (PhEMA) are potentially useful hydrogel materials, for example for soft contact lens applications. The copolymers are particularly appropriate for high water content lenses (70–85% by weight of water) because they are strong materials in spite of their high water content. For example, a copolymer of 83% NVP and 17% PhEMA had a tensile strength of 8.3 kg/cm$^2$ after hydration to an equilibrium water content of 73 grams of water per 100 grams of dry polymer.

When an attempt is made to prepare lenses from this material by sectioning rods of the copolymer prepared by thermal initiation, the materials have been found to be too soft to machine and polish satisfactorily. Attempts to avoid machining by casting the polymers directly into lens-shaped molds provides stiff leathery unsatisfactory specimens, particularly where the PhEMA concentration is greater than about 15%. If the PhEMA concentration is limited to 15% or less, however, the tensile and tear strength of the hydrogel are unsatisfactory.

Accordingly, it is an object of the present invention to provide new and improved contact lens hydrogels which overcome the above-mentioned disadvantages of the prior art.

Another object of the invention is to provide contact lens hydrogels made from copolymers of N-vinyl lactams and hydrophobic acrylates having improved strength characteristics and physical properties.

SUMMARY OF THE INVENTION

These and other objects of the invention are attained by providing a contact lens hydrogel prepared by copolymerizing a mixture containing an N-vinyl lactam and a hydrophobic acrylate and a photoinitiator, such as 2,2-dimethyoxy-2-phenylacetophenone or benzoin methyl ether, a thermal initiator, such as t-butyl peroctoate, and a crosslinker such as allyl methacrylate, directly in a lens mold, using ultraviolet radiation followed by heating. The resulting hydrogel may contain as high as 23% PhEMA, providing a high tensile strength, but nevertheless is surprisingingly flexible, comfortable and strong. A preferred N-vinyl lactam useful in the invention is N-vinyl pyrrolidone and a preferred hydrophobic acrylate is phenylethyl methacrylate.

DESCRIPTION OF PREFERRED EMBODIMENTS

The hydrophobic acrylate useful in the invention is preferably phenylethyl methacrylate (PhEMA) and the N-vinyl lactam is preferably N-vinyl pyrrolidone (NVP) but other conventional copolymers which provide suitable contact lens hydrogels may also be used. The photoinitiator employed in accordance with the invention may be, for example, 2,2-dimethoxy-2-phenylacetophenone (DMPP) or benzoin methyl ether (BZME) and the amount of photoinitiator used may be, for example, from about 0.20 to 0.40 weight percent and is preferably from about 0.30 to 0.35 weight percent. If the amount of photoinitiator is too low, the hydrogel may not be sufficiently resilient to spring back quickly or completely after folding and if the amount is too high, a stiff, leathery hydrogel may be formed.

In addition, a cross-linking agent, such as allyl methacrylate, in an amount from about 0.1 to 1.0 weight percent, and preferably from about 0.4 to about 0.7 weight percent, and a thermal initiator such as t-butyl peroctoate (t-BPO) in an amount from about 0.3 to about 0.7 weight percent, and preferably from about 0.4 to about 0.6 weight percent are included in the polymerization mixture. If desired, additional monomers may be included in the polymerization mixture to provide terpolymers containing two or more hydrophobic monomers and one hydrophilic monomer, such as a phenylethyl methacrylate/2-naphthyl methacrylate/vinyl pyrrolidone terpolymer. Preferably the amount of N-vinyl-2-pyrrolidone used ranges from about 70 weight percent to 85 weight percent, with about 75–80 weight percent being most preferred, while the amount of phenylethyl methacrylate may range from about 15 to about 30 weight percent with amounts from about 20 to 25 weight percent being preferred.

With the above-described combination of a photoinitiator and a thermal initiator in accordance with the invention, excellent results have been obtained by preparing contact lens hydrogels which are cast in lens molds and initially irradiated with ultra violet radiation and then heated to complete the polymerization. It has also been found that, to avoid an undesirable cloudiness or haze effect in the hydrogel, the ultraviolet irradiation should be commenced and completed before any significant polymerization induced by heat or light occurs. The irradiation may be effected by a conventional ultraviolet lamp such as a Spectroline E16 lamp for a period of about thirty to sixty minutes. Subsequently the thermal polymerization is carried out in a conventional air oven such as a Blue-M oven maintained at a temperature of about 90°–130° C.

Under these conditions a soft hydrogel lens may be cast in a mold to provide good strength and flexibility properties while eliminating the machining difficulties characteristic of such hydrogels. This is true even though the hydrogels have an exceptionally high water content, such as 70–85% by weight of the aquated hydrogel. For example, the tensile strength of a hydrogel containing 233 grams of water per 100 grams of dry copolymer is 11 kg/cm$^2$ whereas, in the copolymers of the prior art, 23% by weight PhEMA would have produced a copolymer that was stiff, leathery and unusable.

The following examples further illustrate the present invention but are not intended to limit its scope in any way.

EXAMPLE 1

75 parts of N-vinyl pyrrolidone and 23 parts of phenylethyl methacrylate were mixed together with 0.63 parts of allyl methacrylate and 0.4 parts of 2,2-dimethoxy-2-phenylacetophenone (DMPP) and 0.5 parts t-butyl peroctoate.

The mixture was prepared and maintained at 5° C. and then cast in a lens mold. Immediately after casting the mixture was positioned for 50 minutes directly under Spectroline E16 ultraviolet lamp so that the main axis of the mold holder was parallel to the lamp. The lens mold was then placed in a Blue-M air convection oven at 100° C. under a nitrogen atmosphere for two hours. The lenses were then removed from the mold and hydrated in buffered saline for 8 days.

The resulting hydrogel lenses exhibited a water content of approximately 70% and were completely clear. Water uptake was measured as the uptake from physiological saline (0.9% NaCl in distilled water) at 20° C. The samples were refluxed in buffered saline for 8 days and thereafter autoclaved and allowed to soak in buffered saline for 21 days. The percentage uptake is based on total weight of the aquated hydrogel.

EXAMPLE 2

The formulation and procedure of Example 1 was followed except that the cast lenses were maintained at room temperature and in ambient illumination for 50 minutes before irradiating and heating. All of the lenses prepared in that manner were cloudy on hydration.

EXAMPLE 3

The formulation and procedure of Example 1 were followed except that the cast lenses were left uncovered in ambient temperature for 30 minutes prior to irradiation and heat curing. All of the samples prepared in that manner were hazy on hydration.

EXAMPLE 4

The formulation and preparation of Example 1 were followed except that 0.2 parts of BZME were used in place of the DMPP and the ultraviolet irradiation was carried out for 40 minutes. The hydrogel lenses prepared in this manner had a water content of 67.7% but did not spring back quickly or completely after folding.

EXAMPLE 5

The formulation and procedure of Example 4 were followed except that 0.24 parts of BZME were used. The hydrogel lenses prepared in this manner had a water content of 68.3% but did not spring back quickly or completely after folding.

EXAMPLE 6

The formulation and procedure of Example 4 were followed except that 0.30 parts of BZME were used. The hydrogel lenses prepared in this manner had a water content of 67.6% with satisfactory resilience and provided comfortable feeling strong lenses.

EXAMPLE 7

The formulation and procedure of Example 4 were followed except that 0.34 parts of BZME were used. The hydrogel lenses prepared in this manner had a water content of 67.4 percent and satisfactory resilience and provided comfortable feeling strong lenses. Because of the higher BZME content, this formulation is more susceptible to prepolymerization when exposed to heat or light than the formulation used in Example 6.

In general, conventional precautions, such as storage at low temperature in an opaque container, should be taken to avoid prepolymerization of the mixture when making contact lens hydrogels in accordance with the invention.

Although the invention has been described herein with respect to specific examples, many modifications and variations thereof will readily occur to those skilled in the art. All such variations and modifications are included within the scope of the invention as defined by the following claims.

We claim:

1. A method for preparing a contact lens hydrogel comprising preparing a mixture consisting essentially of an N-vinyl lactam monomer, a hydrophobic acrylate comonomer, and active quantities of a crosslinking agent, a photoinitiator and a thermal initiator effective at elevated temperature, the initiators being added while the mixture is maintained at a temperature below room temperature, casting the mixture into a lens mold while protecting it from heat or ambient illumination sufficient to initiate polymerization, irradiating the cast mixture with ultraviolet illumination sufficient to substantially polymerize the monomer mixture, and heating the mixture in the mold to cure the copolymer.

2. A method according to claim 1 wherein the vinyl lactam content of the mixture is in the range from about 60 to about 85 weight percent.

3. A method according to claim 1 wherein the acrylate monomer content of the mixture is in a range from about 15 to about 30 weight percent.

4. A method according to claim 1 wherein the N-vinyl lactam is N-vinyl-2-pyrrolidone.

5. A method according to claim 1 wherein the acrylate is phenylethyl methacrylate.

6. A method acording to claim 1 wherein the crosslinking agent is allyl methacrylate.

7. A method according to claim 1 wherein the content of the crosslinking agent in the mixture is within the range from about 0.1 to 1.0 weight percent.

8. A method according to claim 1 wherein the photoinitiator is 2,2-dimethoxy-2-phenylacetophenone.

9. A method according to claim 1 wherein the photoinitiator is benzoin methyl ether.

10. A method according to claim 1 wherein the mixture contains from about 0.2 to about 0.4 weight percent of photoinitiator.

11. A method according to claim 1 wherein the mixture contains from about 0.25 to about 0.35 weight percent of photoinitiator.

12. A method according to claim 1 wherein the thermal initiator is t-butyl peroctoate.

13. A method according to claim 1 wherein the mixture contains about 0.3 to about 0.7 weight percent of thermal initiator.

* * * * *